3,749,761
PROCESS FOR THE RECOVERY OF MERCURY
FROM AQUEOUS SOLUTION
Warren E. Dean and Charles M. Dorsett, New Martinsville, W. Va., assignors to PPG Industries, Inc., Pittsburgh, Pa.
No Drawing. Filed Aug. 27, 1971, Ser. No. 175,710
Int. Cl. C01g 13/00
U.S. Cl. 423—562                                        14 Claims

ABSTRACT OF THE DISCLOSURE

A process for removing mercury from solution and particularly from mercury electrolytic cell effluent is provided. The process comprises intermixing with said solution a sulfur compound in an amount sufficient to provide sulfide ion to react with the mercury and other ions present therein which react with sulfide ion and treating the resultant solution with an adsorbent, preferably activated carbon, to remove the soluble mercury.

---

This invention relates to a process for removing mercury from substantially sulfide-free aqueous solutions and particularly for removing mercury from mercury electrolytic cell effluent and waste streams containing mercury.

Several methods are known for recovering mercury. For example, British Pat. 1,138,667 teaches a process for removing mercury from an aqueous caustic soda solution by passing the solution through a scrubbing bed having an adsorbent such as activated carbon. Another method is taught by Parks et al., U.S. Pat. 3,476,552, which comprises treating a mercury containing material with hypochlorite in water to dissolve the mercury and then treating the solution with activated carbon to remove the soluble mercury.

While these methods and a number of other methods are somewhat effective, it has now been discovered that the mercury can be removed to a greater extent when the mercury containing solution is first treated with a sulfur compound in an amount sufficient to provide sulfide ion to react with the mercury and other ions present which react with sulfide ion, and then the resultant solution treated with a minor but effective amount of an adsorbent, preferably activated carbon. Quite surprisingly, it has been found that large excesses of sulfide ion are not beneficial because adsorption capacity is decreased, but that for best results the sulfide ion should be present in an amount just sufficient to react with the mercury and form mercury polysulfides. While the amount necessary to be added will depend upon the other ions in the solution and also the pH of the solution, and can be determined by analyzing the solution to be treated, generally good results can be achieved by adding sulfide ion to the solution until the solution becomes clear indicating that all of the mercury has either precipitated or formed a soluble sulfide.

In addition, the best results are achieved when the sulfur-treated solution is allowed to settle so as to aid the formation of agglomerates and the precipitation of insoluble materials and also preferably filtered before the solution is treated with the adsorbent.

Preferably, the soluble chlorine (to include elemental chlorine, hypochlorite, and chlorate ion) normally present in brines is substantially removed from the solution by the addition of excess sulfide compound to react with the soluble chlorine as chlorine tends to decrease the amount of mercury adsorbed.

Further, the pH of the solution to be treated should be at least about 7 or above as the mercury polysulfides are only formed to any appreciable extent in neutral and alkaline solutions and are soluble therein. A preferred range is between about 10 and about 13 as the mercury polysulfides are more readily formed and also are formed with less excess sulfide ion than at lower pH's.

The sulfur compound employed can be any soluble or sparingly soluble sulfur compound which will provide sulfide ion in the solution. Exemplary of suitable compounds are the alkali metal sulfides such as sodium sulfide, potassium sulfide, and lithium sulfide; the alkaline earth metal sulfides such as magnesium sulfide, calcium sulfide, strontium sulfide, or beryllium sulfide; a hydrosulfide such as sodium hydrosulfide or hydrogen sulfide can be bubbled directly into the solution. Generally the sulfide is added as an aqueous solution but flake materials such as sodium sulfide or sodium hydrosulfide can be used.

The term "mercury sulfide" as used herein means mercuric sulfide, mercurous sulfide, or a mixture thereof. Normally the mercury sulfide is present as mercuric sulfide and thus one mole of sulfide ion per mole of mercury ion would provide a stoichiometric equivalent.

In addition to activated carbon, other adsorbents can be employed such as particulate: polyethylene, polytetrafluoroethyelne, graphite, carbon black, charcoal, asbestos, Fuller's earth, coal dust, and ground rubber. Activated carbon, however, is most effective and preferred. The amount employed will depend upon the particular adsorbent employed, the amount of excess sulfide, the presence of other ions, etc., but generally from about 20 to about 50 parts adsorbent per part mercury will be sufficient to remove essentially all of the soluble mercury.

The sulfide ion can be present in excess of up to about 50 parts-per-million without a significant decrease in adsorption. It is preferred, however, to have an excess over the stoichiometric equivalent of between about 1 and about 20 parts per million because this range favors both the formation of insoluble mercury sulfide and soluble mercury polysulfide resulting in a greater total amount of mercury recovery.

Although it is not required, flocculents or settling agents can be employed, if desired, such as, for example, soluble compounds of iron such as iron chloride, or chlorides and other soluble compounds of magnesium, cobalt, nickel, copper, zinc; sulfates such as aluminum sulfate, ferrous sulfate; acids and alkalis, glue, starches, and gums, or any compound which is insoluble in alkaline solution. In addition, conventional filtering aids can be employed if desired. They aid in the removal of solids prior to the adsorption treatment.

The temperature of the solution is not critical but in brines the temperature is preferably at or above room temperature so that salt does not precipitate, and as a general rule more rapid flocculation and precipitation will be obtained at higher temperatures.

The following examples are illustrative of the invention and its preferred embodiments. All percentages are by weight unless otherwise indicated and the experiments were conducted at room temperature (30° C.).

EXAMPLE 1

A 1.8-liter solution was prepared containing 10 p.p.m. mercury by dissolving mercury chloride in distilled water. Caustic (14.4 grams of 50 percent sodium hydroxide) was added to the solution to give a pH of 12.7. Sodium sulfide was then slowly added (23 milliliters of .08 normal sodium sulfide) in an amount just sufficient to convert the mercury into a soluble polysulfide and provide a colorless solution. The resultant solution contained 14.8 p.p.m. excess sulfide over the amount which otherwise would have caused mercury sulfide precipitate. The solution was placed in a bottle and capped to avoid oxidation and aged for several days so that finely-divided solids could agglomerate and settle. The solution was then filtered through a 0.3 micron Millipore filter under nitrogen to avoid oxidation of the polysulfide and 500 milliliter aliquots were mixed with 0.001, 0.002, and 0.004 gram (2, 4 and 8 p.p.m.), respectively, of activated carbon (Nuchar C–115—sold by Westvaco Corporation). The mixtures were stirred for 12 hours and analyzed for mercury content along with a control filtered without activated carbon. The results are shown in the following Tables I and II:

TABLE I

| Carbon (p.p.m.) | Mercury analysis of the filtrate (p.p.m.) | | Mercury adsorbed (p.p.m.) | Mercury adsorbed per unit wt. of carbon |
| --- | --- | --- | --- | --- |
| | Duplicates | Averages | | |
| 0 | 10.000 | 10.000 | | |
| 2 | 1.465 / 1.550 | 1.507 | 8.493 | 4.246 |
| 4 | .210 / .216 | .213 | 9.787 | 2.447 |
| 8 | .034 | .034 | 9.966 | 1.246 |

TABLE II

[Carbon treatment of synthetic mercury polysulfide solutions]

| Starting solutions | | Sulfide treatment, excess sulfide (p.p.m.) | Carbon treatment [1] | | Mercury adsorbed per unit wt. of carbon [2] |
| --- | --- | --- | --- | --- | --- |
| Mercury (p.p.b.) | NaOH (g./l.) | | Carbon (p.p.m.) | Mercury (p.p.b.) | |
| 5,000 | [3] 1.1 | 3.3 | 0 / 40 / 80 | 524 / 19 / 6 | |
| 5,000 | [4] 4.0 | 3.3 | 0 / 20 / 30 / 40 | 5,000 / 1.0 / 1.0 / 1.0 | 0.25 |
| 10,000 | 4.0 | 14.8 | 0 / 10 / 40 | 8,100 / 27 / 4 | 0.80 |
| 10,000 | 4.0 | 14.8 | 0 / 2 / 4 / 8 | 10,000 / 1,507 / 213 / 34 | 4.24 |
| 10,000 | 8.0 | 14.8 | 0 / 10 | 9,960 / 7,300 | 0.26 |
| 10,000 | 4.0 | 28.8 | 0 / 10 | 9,800 / 8,660 | 0.12 |
| 10,000 | 4.0 | 56.8 | 0 / 10 | 9,780 / 8,380 | 0.14 |

[1] With Nuchar C–115 after filtering the sulfide treated samples through 0.3 micron Millipore filters.
[2] See Table I.
[3] pH 12.4.
[4] pH 12.7.

From the data reported in the tables, it can be seen that when the concentration of sulfide present is just about equal to the amount required to dissolve the mercury, large amounts of mercury can be adsorbed up to about 4 parts of mercury per unit weight of activated carbon.

The general procedure and conditions of Example 1 was repeated with solutions containing varying amounts of chloride ion and the effect of chloride on the adsorption of mercury polysulfide is shown by the data presented in the following Table III:

TABLE III

[Carbon treatment of synthetic mercury polysulfide solutions]
The Effect of Chloride on Adsorption

| Starting solutions | | | Sulfide treatment, excess sulfide (over Hg) (p.p.m.) | Carbon treatment [1] | | Mercury adsorbed per unit wt. of carbon [2] |
| --- | --- | --- | --- | --- | --- | --- |
| Mercury (p.p.b.) | NaOH (g./l.) | NaCl (g./l.) | | Carbon (p.p.m.) | Mercury [3] (p.p.b.) | |
| 10,000 | 4.0 | 22.2 | 14.8 | 0 / 11 | 9,880 / 10 | 0.89 |
| 10,000 | 4.0 | 100.0 | 14.8 | 0 / 11 | 10,000 / 2,700 | 0.66 |
| 10,000 | 4.0 | 300.0 | 14.8 | 0 / 11 | 10,000 / 9,140 | 0.08 |
| 10,000 | 4.0 | 300.0 | 14.8 | 0 / 100 | 8,000 / 480 | 0.075 |

[1] With Nuchar C–115 after filtering the sulfide treated samples through a 0.3 micron Millipore filter.
[2] See Table I.
[3] Mercury concentrations are based on a density of 1.0.

From the table it can be seen that the adsorption of mercury polysulfide from solutions with dissolved chloride (sodium chloride) is diminished as the chloride concentration is increased. Accordingly, for best results the mercury solution should not have more than about 150, and preferably not more than about 75 grams per liter chloride ion.

EXAMPLE 2

A sewer stream from a mercury electrolytic cell was analyzed and found to contain: 11,240 p.p.b. mercury, 181 p.p.b. NaOCl, 10.9 grams per liter chloride ion, and had a pH of 12.4. The amount of sodium sulfide required to precipitate metal sulfides and to react with the NaOCl was determined by adding different amounts of standardized sodium sulfide to unfiltered samples of the sewer stream. It was found by titration that 21.90 milliliters of 0.08 normal sodium sulfide per liter would give 0.35 p.p.m. excess sulfide. Larger amounts of excess sulfide were added to samples of the sewer stream to form the mercury polysulfide complex. These solutions were allowed to settle for several days in sealed containers so that the solids would agglomerate and settle. The mixtures were then filtered through 0.3 micron Millipore filters and the filtrate treated with activated carbon as follows: a polysulfide solution which contained 5.5 p.p.m. excess sulfide was treated with 23, 42, and 68 p.p.m. activated carbon (Nuchar C–115—manufactured by Westvaco Corporation) by adding 0.0110, 0.0200, and 0.0323 gram of the carbon to 425 milliliter aliquots of the filtered polysulfide solution. The mixtures of polysulfide and carbon were mixed overnight and then separated by filtration through 0.3 micron Millipore filters. The filtering was carried out under nitrogen to avoid oxidation of the polysulfide. The samples and a control filtered without activated carbon were analyzed and the results are reported in the following Tables IV and V:

TABLE IV

| Carbon (p.p.m.) | Mercury analysis of the filtrate (p.p.m.) | | Mercury adsorbed (p.p.m.) | Mercury adsorbed per unit wt. of carbon |
| --- | --- | --- | --- | --- |
| | Duplicates | Averages | | |
| 0 | 6.875 / 6.740 | 6.807 | | |
| 23 | .402 / .396 | .399 | 6.408 | 0.280 |
| 42 | .650 / .530 | .590 | 6.217 | 0.148 |
| 68 | .230 / .249 | .240 | 6.667 | 0.098 |

TABLE V

[Carbon treatment of mercury polysulfide solutions prepared from waste streams]

| | Sample description and analysis | | | | Sulfide treatment, excess sulfide over Hg (p.p.m.) | Carbon treatment | | Mercury adsorbed per unit weight of carbon |
|---|---|---|---|---|---|---|---|---|
| | Mercury (p.p.b.)[1] | pH | Chloride (g./l.) | NaOCl (p.p.m.) | | Carbon (p.p.m.) | Mercury in filtrate (p.p.b.) | |
| Sample A | 6,180 | 12.4 | 22.8 | 507 | 14.0 | 0 / 21.2 / 47.4 / 84.0 | 3,700 / 3,600 / 3,600 / 3,600 | |
| The samples that had been treated with 21.2 and 47.4 p.p.m. carbon (see above) were composited and re-treated | | | | | | 0 / 11.1 | 3,410 / 347 | 0.26 |
| Sample B | 11,240 | 12.4 | 10.9 | 181 | 5.5 | 0 / 23 / 42 / 68 | 6,807 / 399 / 590 / 240 | 0.28 |
| Sample C | 11,240 | 12.4 | 10.9 | 181 | 10.6 | 0 / 2.2 / 13.1 | 9,060 / 3,165 / 4,790 | 2.68 / 0.32 |
| Sample D | 3,330 | 11.7 | 14.2 | 2 | 10.2 | 0 / 6.6 / 11.1 / 22.2 | 1,250 / 405 / 380 / 348 | 0.13 |
| Sample E | 1,640 | 12.7 | 45.2 | <1 | 12.4 | 0 / 5 / 10 | [2]1,752 / 576 / 98 | 0.24 |

[1] After filtering through a 0.3 micron Millipore filter.
[2] Prepared from unfiltered pond discharge which probably contained more available mercury than the filtered sample (1,640 p.p.b. mercury).

From the results reported in Table V, it can be seen that the activated carbon was highly effective in removing mercury polysulfide from the mercury electrolytic cell brine waste stream but that the adsorption of the mercury polysulfide was not as high as that from the synthetic mixture. The reason for this is believed to be that other metals are present in electrolytic cell brine which tends to poison the activated carbon. This problem can be obviated, however, by retreating the samples with fresh activated carbon as was done with some of the examples reported in Table V.

The general procedure and conditions of Example 1 was repeated employing other adsorbents, and the results are given in the following Table VI.

TABLE VI

| Solution | Excess sulfide over Hg (p.p.m.) | Adsorbent | Parts of Hg adsorbed per unit weight adsorbent |
|---|---|---|---|
| Acid chloride (pH 2.5) | None | Activated carbon | 0.05 |
| Alkaline chloride | None | do | 0.02-0.03 |
| Aqueous mercury polysulfide | 5-10 | Asbestos | 0.022 |
| Do | 5-10 | Fuller's earth | <0.01 |
| Do | 5-10 | Coal dust | <0.01 |
| Do | 5-10 | Ground rubber | <0.01 |

Although the invention has been described with reference to specific details of particular embodiments, it is not intended thereby to limit the scope of the invention except insofar as the specific details are recited in the appended claims.

What is claimed is:

1. A process for removing mercury from an aqueous solution containing same, and having a pH of at least about 7 comprising intermixing with said solution a sulfur compound in an amount sufficient to provide sulfide ion to form soluble mercury polysulfide and sulfide to combine with any other ions which combine with sulfide ion contained therein; and treating the resultant solution with an activated carbon adsorbent to remove the soluble mercury polysulfide therein.

2. The process of claim 1 wherein the aqueous solution is allowed to settle for a time sufficient to form agglomerates and said agglomerates removed before the solution is treated with the adsorbent.

3. The process of claim 1 wherein the aqueous solution is both allowed to settle and filtered to remove agglomerates and precipitates before the solution is treated with the adsorbent.

4. The process of claim 1 wherein the aqueous solution is effluent from a mercury electrolytic cell.

5. The process of claim 1 wherein the aqueous solution has a pH between about 10 and about 13.

6. The process of claim 1 wherein the aqueous solution contains not more than about 150 grams per liter chloride ion.

7. The process of claim 1 wherein the solution contains not more than about 75 grams per liter chloride ion.

8. The process of claim 1 wherein the solution contains between about 1 and about 20 parts per million excess sulfide ion over the stoichiometric equivalent of mercury and other ions which react with sulfide ion present in the solution.

9. The process of claim 1 wherein the solution contains not more than about 50 parts per million sulfide ion over the stoichiometric equivalent of mercury and other ions contained therein which react with sulfide ion.

10. A process for removing mercury from effluent from a mercury electrolytic cell containing mercury, said effluent having a pH of between about 10 and about 13, comprising mixing with said effluent a sulfur compound selected from alkali metal sulfides, alkaline earth metal sulfides, sodium hydrosulfide and hydrogen sulfide, in amounts sufficient to provide sulfide ion to form soluble mercury polysulfide, and sulfide ion to combine with any other ions contained therein that combine with sulfide ion, and treating the resultant effluent with activated carbon adsorbent to remove essentially all of the soluble mercury polysulfide.

11. The process of claim 10 wherein the sulfur compound is sodium sulfide.

12. The process of claim 10 wherein the solution contains not more than about 150 grams per liter chloride ion.

13. The process of claim 10 wherein the effluent contains not more than about 75 grams per liter chloride ion.

14. The process of claim 10 wherein the effluent has a pH between about 10 and about 13.

References Cited

UNITED STATES PATENTS

| | | | |
|---|---|---|---|
| 1,718,491 | 6/1929 | Schad | 23—134 X |
| 2,860,952 | 11/1958 | Bergeron et al. | 23—134 |
| 3,061,412 | 10/1962 | Giordano | 23—134 |
| 3,085,859 | 4/1963 | Scholten et al. | 23—134 |
| 3,115,389 | 12/1963 | Deriaz | 23—89 |
| 3,476,552 | 11/1969 | Parks et al. | 75—101 R |

EDWARD STERN, Primary Examiner

U.S. Cl. X.R.

423—99, 109; 75—101 R; 210—39, 40